United States Patent [19]

Morton, Jr.

[11] Patent Number: 5,673,966
[45] Date of Patent: Oct. 7, 1997

[54] DUCK HUNTER'S TULE SEAT

[75] Inventor: William D. Morton, Jr., 3596 Rowena Ct., Santa Clara, Calif. 95054-2253

[73] Assignee: William D. Morton, Jr., Santa Clara, Calif.

[21] Appl. No.: 726,672

[22] Filed: Oct. 7, 1996

[51] Int. Cl.⁶ ..................................... A47C 9/10
[52] U.S. Cl. .............. 297/4; 297/451.5; 297/195.11; 403/315
[58] Field of Search ............. 297/4, 451.4, 451.5, 297/195.13; 403/315

[56] References Cited

U.S. PATENT DOCUMENTS

| | | | |
|---|---|---|---|
| 1,998,406 | 4/1935 | Gouverneur | 403/315 X |
| 3,443,530 | 5/1969 | Carlson | 297/440.1 X |
| 3,467,033 | 9/1969 | Sienkiewicz et al. | 248/156 |
| 3,674,308 | 7/1972 | Radding | 297/344.21 X |
| 3,892,426 | 7/1975 | Ferris | 403/315 X |
| 4,085,686 | 4/1978 | Turner et al. | 248/156 X |
| 4,098,478 | 7/1978 | Spitzke | 297/4 X |
| 4,121,605 | 10/1978 | Schmerl | 135/66 X |
| 4,451,080 | 5/1984 | Nix | 297/4 |
| 4,586,207 | 5/1986 | Cornette | 248/156 X |
| 4,724,773 | 2/1988 | Newberry et al. | 108/150 |
| 5,111,800 | 5/1992 | Reynolds | 248/156 X |
| 5,417,334 | 5/1995 | Wu | 248/156 X |
| 5,470,038 | 11/1995 | Clark | 248/156 |

FOREIGN PATENT DOCUMENTS

| | | | |
|---|---|---|---|
| 759833 | 2/1934 | France | 297/4 |
| 89001748 | 3/1989 | WIPO | 297/440.1 |

*Primary Examiner*—Peter R. Brown
*Assistant Examiner*—David E. Allred

[57] ABSTRACT

A seat, which is rectangular shaped (1) pivots on a round plastic member (2) which is fixed to a metal tube (3). A plastic retainer tab (4) when depressed with the fingers, allows the seat to slide along the aluminum extrusion extentions, until the seat assembly is clear from the round plastic member (2). Installing the seat, on the storage platform in the form of a unitary cross-bar (5) is accomplished by engaging the platform with the end of the seat aluminum-extrusion, and sliding the seat to the middle of the seat until the plastic retainer (4) snaps into place. A large disc assembly (6) is attached to the lower end of the metal tube (3) with a retainer pin (7) which engages the disc assembly (6) to the metal tube (3) in one of several selective positions. Storage of the disc assembly (6) to the storage platform (5) is accomplished by removing the retainer pin (7) then separating it from the metal tube (3). The disc assembly (6) is then placed on the storage platform extention (5) then reinserting the retainer pin (7) to secure the disc assembly on the storage platform (5). An adjustable carrying strap (8) is attached in two places on the metal tube (3). A plastic spear point (9) is secured to the end of the metal tube (3).

5 Claims, 5 Drawing Sheets

DUCK HUNTER'S TULE SEAT

BACKGROUND OF THE INVENTION

1. Field of the Invention

This invention relates to seats or stools and is concerned with portable, lightweight, minimum of bulk, and seats which will not sink when used by duck hunters or others in a shallow water environment.

Conventionally, duck hunters wear hip boots or chest waders to enter the wetlands, and usually find they must stand all day in the watery surroundings of tules or marshy swamp, through no choice.

It is the aim of this invention to provide for duck hunters and others, with a seat that is portable including a carrying strap, lightweight, requires no tools to assemble or disassemble, will not sink in the ground below water level, with the ability to adjust seat height above the water level, and swivels 360 degrees as the user sits on the seat. In a weed or tule location, sitting closer to the water as opposed to standing will place the duck hunter further out of sight from incoming sharp eyed ducks. In addition, the rule seats ability to swivel 360 degrees around the axis of the metal tube support, gives the duck hunter complete flexibility to turn in any direction to address incoming ducks.

Structural integrity and durability is provided to the user through the use of three aluminum extrusions, two in the seat assembly, and one in the vertical tube support. Remaining components are primarily plastic, and stainless steel hardware to endure through obvious harsh exposure including cold weather.

The seat has two receptacles with which to mate. One is on top of the tube support, and the other is on a storage platform in the form of a unitary cross-bar located on the tube support. Likewise, the disc assembly has two locations. One is on the lower end of the tube support in one of several selective locations, and the other is on the storage platform shared by the seat.

When both the seat and the disc assembly are placed on the storage platform, either the rule seat is ready to be portaged into a using location, or stored in the least bulky attitude. Conversely, when the seat is affixed to the top of the tube support, and the disc is located in one of several selective locations for seat height above the water, the point end of the rule seat is thrusted vertically down through the water until the disc prevents further downward movement of the metal tube support and spear point.

Conveniently, removal of the seat in either it's location on top of the tube support, or on the storage platform, is accomplished by deflecting a cantilevered sheet of plastic with fingers and simultaneously sliding the seat away from the plastic pivot to clear the end of the channel-like aluminum extrusion. The change of location for the disc assembly at either the tube support end or the storage platform, is accomplished by rotating the end of a stainless steel retainer pin then extracting it through the disc assembly collar and the mating position. Replacement of either the seat or the disc assembly, is accomplished with the reverse action required to remove, except the seat will merely snap into place with no need to actuate the cantilevered plastic sheet with the fingers.

A carrying strap provides the duck hunter with a means of portaging the tule seat to the using destination and is complete with a separatable buckle, which also includes a strap tightening or loosening provision. The separatable buckle will likely be conveniently used for removing the tule seat by the duck hunter after portaging, since bulky clothes are usually worn in this sport.

2. Description of the Prior Art

Various seats or stools have been developed where the seat reconfigures to convert the seat to a cane. U.S. patents with this approach include U.S. Pat. No. 4,700,914 issued Oct. 20, 1987, U.S. Pat. No. 2,800,164 issued Jul. 23, 1957, U.S. Pat. No. 2,690,211 issued Sep. 28, 1954, and U.S. Pat. No. 280,843 issued Jul. 10, 1883. Foreign patent documents include Britian Patent No. 16468 issued Aug. 29, 1894, Germany Patent No. 94195 issued Sep. 24, 1897, and Germany Patent No. 494,905 issued Mar. 31, 1930. None of the prior art seats are designed to be used in a shallow water environment nor do the seats rotate 360 degrees around the centerline axis of the support tube. In addition, none of the prior art seats are designed to separate the seat and the lower ground contacting area to reconfigure the seat for portaging or storage.

SUMMARY OF THE INVENTION

A simple, easy to use seat to be used in shallow water environments such as marsh and wooded wetlands by duck hunters and others has been shown and described.

When a duck hunter sits on the tule seat, the large disc which is secured to the lower metal tube support, prevents further entry into the ground below the water level. The tule seats versatility for use as a pivoting seat in a watery surrounding, coupled with its simply ability to reconfigure to a less bulky configuration for portaging or storing, makes the tule seat unique for its intended purpose.

DETAILED DESCRIPTION OF THE PREFERRED EMBODIMENT

Figure 1:
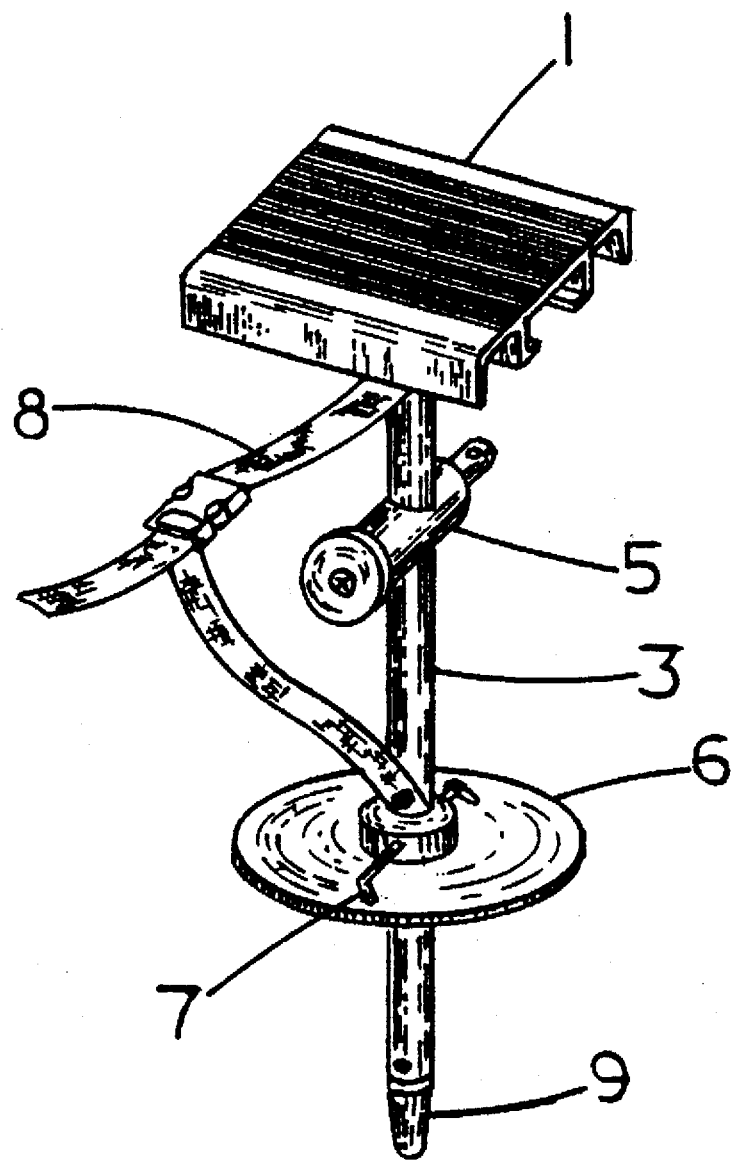
FIG. 1 is perspective view of the duck hunter's tule seat shown in the ready to use configuration.
Figure 3:
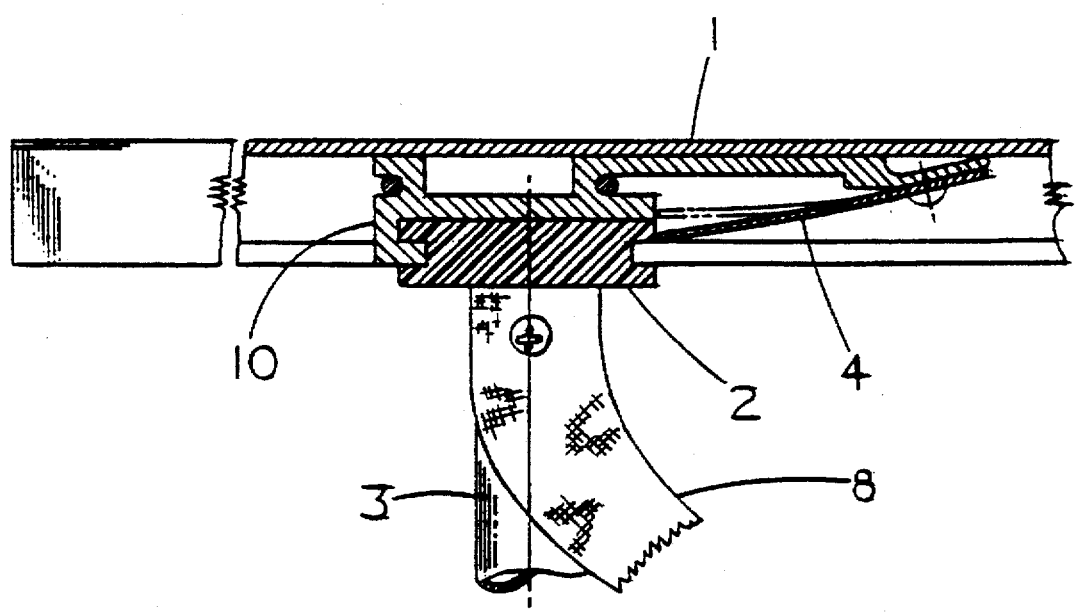
FIG. 3 is a cross section taken through the seat, pivot, and the seat retainer sub-assembly.
Figure 4:
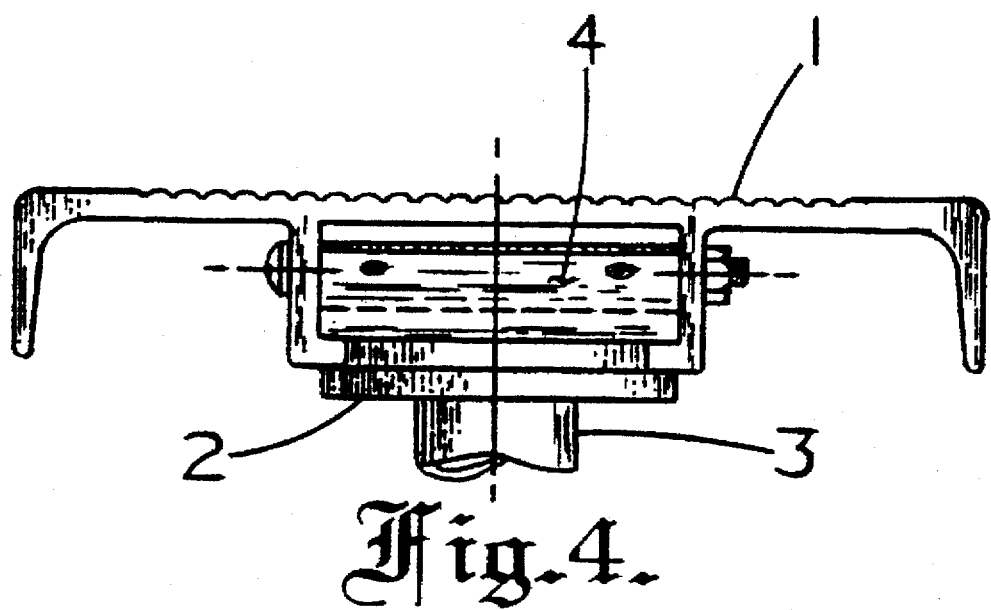
FIG. 4 is an end view of the seat showing the channel-like aluminum extrusion, the pivot, the tube support, and the seat retention members.
Figure 5:
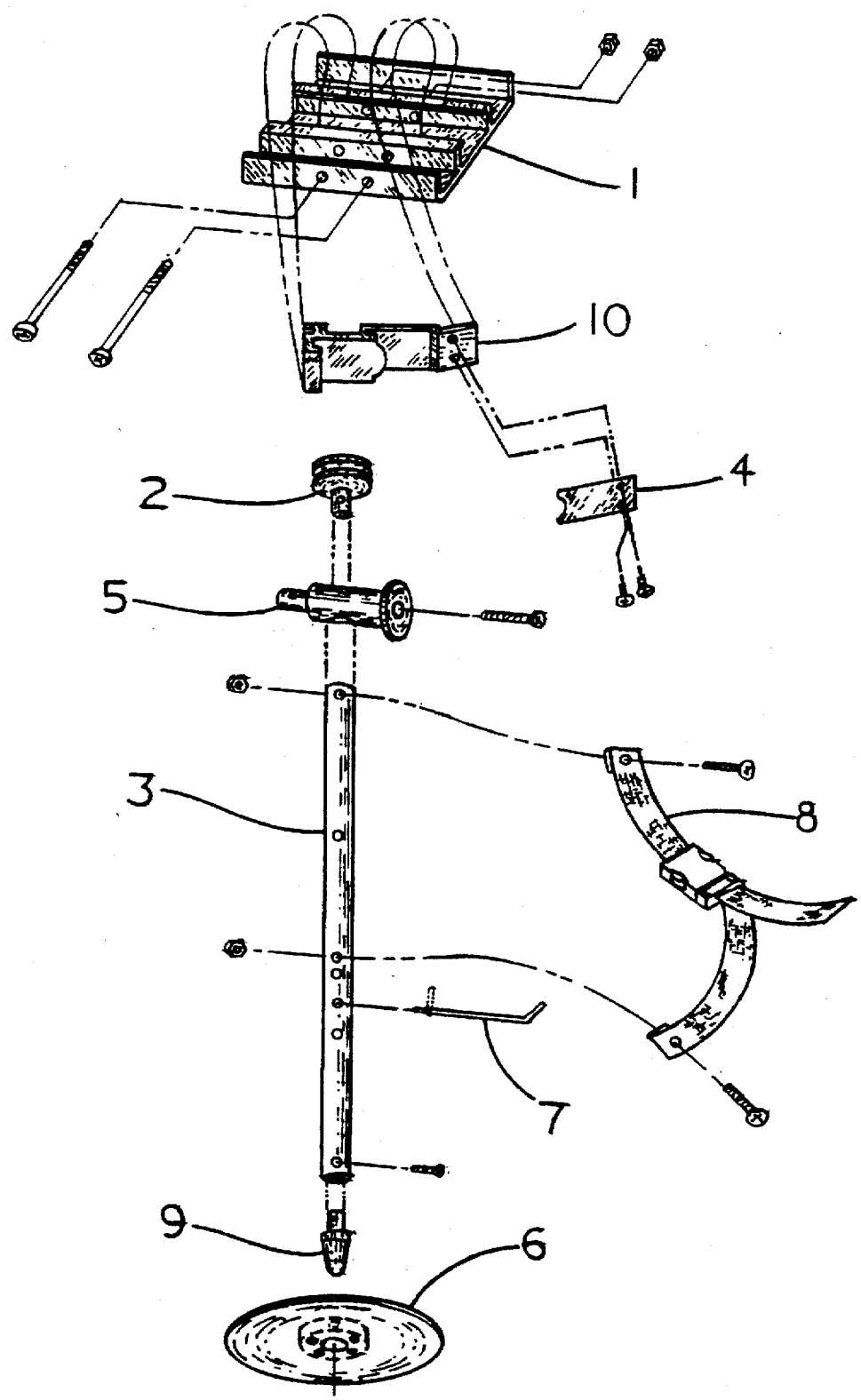
FIG. 5 is an exploded view showing all components which comprise the makeup of the tule seat.

The rule seat of FIG.1 has a seat 1 with a rectangular sitting area as formed by an aluminum extrusion. FIG. 3 shows a second aluminum extrusion 10 and a sheet plastic retainer 4 which is secured to the extrusion 10 with two screws. The sub-assembly consisting of the extrusion 10 and the plastic retainer 4 is secured with two bolts and nuts beneath the seat surface at the center of the seat. FIG. 4 also shows the attachment from the end view of the seat 1.

The metal support tube 3, as shown in FIG. 3 has a plastic pivot 2 secured at its upper end by a bolt and nut. The same bolt and nut also secures one end of the carrying strap 8. The other end of the carrying strap 8 is secured with a bolt and nut to the metal tube 3 in a hole provided for the purpose and located just above the disc assembly 6.

With the seat assembled as it is in FIGS. 1, 3, and 4, the seat will pivot 360 degrees around the centerline of the vertical metal tube 3. The plastic retainer 4 serves as a stop or keeper to contain the plastic pivot 2 in a nest consisting of the aluminum channel seat 1 extrusion extentions, an extention on the retainer extrusion 10, and the plastic retainer 4.

In FIG. 1, a large disc assembly 6 is shown just above the lower end of the metal tube 3. It is secured in one of three hole locations on the metal tube 3 with a stainless steel retainer pin 7. On the extreme lower end of the metal tube 3, is located a plastic spear 9, which assists in thrusting the tule seat into the ground beneath the water until the disc assembly 6, prevents further progress.

In FIG. 1, a storage platform in the form of a unitary cross-bar 5, is shown secured to the metal tube with a screw.

Figure 2:
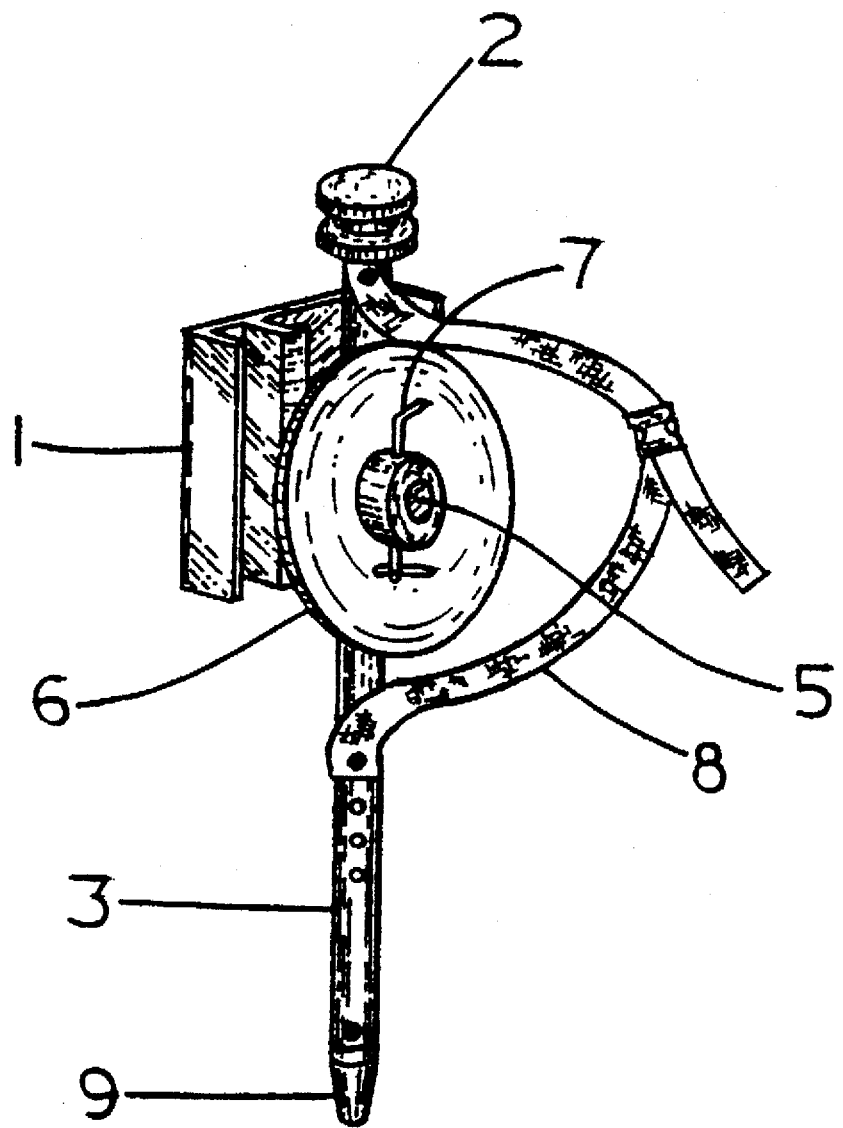
FIG. 2 is a perspective view of the duck hunter's tule seat shown assembled in the portage or storage configuration.

In FIG. 2, the tule seat is shown in its portage or storage configuration. The plastic storage platform in the form of a unitary cross-bar 5, located on the metal tube 3, serves as a receptacle to receive the seat assembly 1 and the disc assembly 6 including the retainer pin 7. The adjustable carrying strap 8, is complete with an adjustable strap buckle which also separates in quick disconnect fashion.

I claim:

1. A seat assembly adapted for alternate configuration arrangements comprising:

(a) a tubular support comprising a fixed pivot on an upper end, a fixed spear point on a lower end, said tubular support further comprising a carrying strap secured in two places, and a storage platform in the form of a unitary cross-bar fixed to said tubular support between said ends;

(b) a rectangular shaped aluminum-extrusion seat which pivots, when engaged with the fixed pivot in a configuration of use, said aluminum-extrusion seat pivots 360 degrees around a longitudinal axis of the tubular support, and is quickly removed by manually pressing a cantilevered plastic sheet fixed to said seat, then moving the pivot toward an end of the aluminum-extrusion seat until the pivot is clear from the seat;

(c) a large disc, at least 4 times larger in diameter than, the diameter of the tubular support, said disc slidably received on said tubular support, a retaining pin for positioning said disc in one of a plurality of selected positions for seat height adjustment in said configuration of use;

(d) said seat assembly reconfigured to a stowed configuration for portage or storage by attaching the rectangular aluminum-extrusion seat and the large disc to opposite ends of the unitary cross-bar of the tubular support, wherein the unitary cross-bar receives both the rectangular aluminum-extrusion seat and the large disc by the same mechanical securing means as does the tubular support when the assembly is in the configuration of use.

2. A seat assembly as claimed in claim 1, wherein a plurality of holes are provided in the tubular support which receive said retaining pin to offer a number of positions for the disc corresponding to said plurality of selected positions.

3. A seat assembly as claimed in claim 1, wherein the large disc can be removed from the round tube support by extracting a removable retainer pin.

4. A seat assembly as claimed in claim 1, wherein said carrying strap comprises a buckle that separates and provides for adjustment.

5. A seat assembly as claimed in claim 1, wherein its overall dimensional envelop is reduced for portaging or storage by reconfiguring the seat assembly to the stowed configuration.

* * * * *